United States Patent
Denker et al.

(10) Patent No.: US 9,286,592 B2
(45) Date of Patent: Mar. 15, 2016

(54) METHODS AND SYSTEMS FOR ACCESS CONTROL USING A NETWORKED TURNSTILE

(75) Inventors: Dennis Denker, Phoenix, AZ (US);
Shigeki Hirose, Sammamish, WA (US);
Jonathan Scott Wall, Tempe, AZ (US)

(73) Assignee: Live Nation Entertainment, Inc., Beverly Hills, CA (US)

( * ) Notice: Subject to any disclaimer, the term of this patent is extended or adjusted under 35 U.S.C. 154(b) by 2020 days.

(21) Appl. No.: 11/951,988

(22) Filed: Dec. 6, 2007

(65) Prior Publication Data

US 2008/0154623 A1 Jun. 26, 2008

Related U.S. Application Data

(60) Provisional application No. 60/873,324, filed on Dec. 7, 2006.

(51) Int. Cl.
G06Q 10/00 (2012.01)
G07B 15/00 (2011.01)
G06Q 10/08 (2012.01)

(52) U.S. Cl.
CPC .............. *G06Q 10/087* (2013.01); *G07B 15/00* (2013.01)

(58) Field of Classification Search
USPC .................. 705/5, 26, 14.51, 6, 7.11; 709/225
See application file for complete search history.

(56) References Cited

U.S. PATENT DOCUMENTS

| | | |
|---|---|---|
| 5,095,196 A | 3/1992 | Miyata |
| 5,408,417 A | 4/1995 | Wilder |
| 5,496,991 A | 3/1996 | Delfer et al. |
| 5,794,207 A | 8/1998 | Walker et al. |
| 5,797,126 A | 8/1998 | Helbing et al. |
| 5,797,127 A | 8/1998 | Walker et al. |
| 5,835,896 A | 11/1998 | Fisher et al. |

(Continued)

FOREIGN PATENT DOCUMENTS

| | | |
|---|---|---|
| EP | 1 054 335 A2 | 11/2000 |
| JP | 53 142300 A | 12/1978 |

(Continued)

OTHER PUBLICATIONS

Article from Website; Tech Web; "Byter Up: Ballparks Go High-Tech"; Mar. 31, 1999 (4 pages).

(Continued)

*Primary Examiner* — Mark A Fleischer
(74) *Attorney, Agent, or Firm* — Kipatrick Townsend & Stockton LLP

(57) ABSTRACT

The present invention is related to systems and methods for providing access control to a venue or other location using a networked system. Described is a computer controlled turnstile system, comprising a turnstile, including a computer interface, and a computer system coupled to the turnstile and to user terminals. Program code is configured to receive a query from a user for a plurality of admissions to an event, wherein the query is received from a user terminal, associate the plurality of admissions with a single first token, provide a user interface via which the user can re-associate a first quantity of the plurality of admissions with a second token, store in memory information related to the re-association, at least partly in response to information obtained from the second token at a venue associated with the event, access the information and enable the turnstile to admit a number of persons that corresponds to the first quantity.

21 Claims, 7 Drawing Sheets

(56) References Cited

U.S. PATENT DOCUMENTS

| | | | |
|---|---|---|---|
| 5,845,265 A | 12/1998 | Woolston | |
| 5,930,761 A * | 7/1999 | O'Toole | 705/5 |
| 6,023,685 A | 2/2000 | Brett et al. | |
| 6,023,686 A | 2/2000 | Brown | |
| 6,067,532 A | 5/2000 | Gebb | |
| 6,082,620 A | 7/2000 | Bone | |
| 6,107,932 A | 8/2000 | Walker et al. | |
| 6,119,096 A | 9/2000 | Mann et al. | |
| 6,216,227 B1 | 4/2001 | Goldstein | |
| 6,240,396 B1 | 5/2001 | Walker et al. | |
| 6,243,691 B1 | 6/2001 | Fisher et al. | |
| 6,263,315 B1 | 7/2001 | Talluri | |
| 6,446,917 B2 | 9/2002 | Dieckmann et al. | |
| 6,496,809 B1 | 12/2002 | Nakfoor | |
| 6,662,230 B1 | 12/2003 | Eichstaedt et al. | |
| 6,679,421 B2 | 1/2004 | Shin | |
| 6,685,093 B2 | 2/2004 | Challa et al. | |
| 6,704,713 B1 | 3/2004 | Brett | |
| 6,736,322 B2 | 5/2004 | Gobburu | |
| 6,749,120 B2 | 6/2004 | Hung | |
| 6,764,009 B2 | 7/2004 | Melick | |
| 6,850,901 B1 | 2/2005 | Hunter et al. | |
| 6,854,651 B2 | 2/2005 | Smith | |
| 6,877,661 B2 | 4/2005 | Webb | |
| 6,907,405 B2 | 6/2005 | Brett | |
| 6,925,307 B1 | 8/2005 | Mamdani | |
| 6,937,998 B1 | 8/2005 | Swartz et al. | |
| 6,965,914 B2 | 11/2005 | Dowling | |
| 6,999,936 B2 | 2/2006 | Sehr | |
| 7,025,259 B2 | 4/2006 | Mausy | |
| 7,031,945 B1 | 4/2006 | Donner | |
| 7,044,362 B2 | 5/2006 | Yu | |
| 7,070,103 B2 | 7/2006 | Melick et al. | |
| 7,083,081 B2 | 8/2006 | McGee et al. | |
| 7,114,179 B1 | 9/2006 | Ritter et al. | |
| 7,120,603 B2 | 10/2006 | Kodaka | |
| 7,159,778 B1 | 1/2007 | Kochevar et al. | |
| 7,162,454 B1 | 1/2007 | Donner | |
| 7,174,308 B2 | 2/2007 | Bergman | |
| 7,207,060 B2 | 4/2007 | Immonen | |
| 7,209,903 B1 | 4/2007 | Mamdani et al. | |
| 7,215,978 B2 | 5/2007 | Hasegawa | |
| 7,233,408 B2 | 6/2007 | Henderson et al. | |
| 7,240,036 B1 | 7/2007 | Mamdani et al. | |
| 7,280,975 B1 | 10/2007 | Donner | |
| 7,328,166 B1 | 2/2008 | Geoghegan et al. | |
| 7,333,943 B1 | 2/2008 | Charuk et al. | |
| 7,455,224 B2 | 11/2008 | Kochevar et al. | |
| 7,475,138 B2 | 1/2009 | Graveline et al. | |
| 7,584,123 B1 | 9/2009 | Karonis et al. | |
| RE43,157 E | 2/2012 | Bishop et al. | |
| 2001/0018660 A1 | 8/2001 | Sehr | |
| 2001/0056368 A1 | 12/2001 | Oguro | |
| 2002/0040308 A1 | 4/2002 | Hasegawa | |
| 2002/0042729 A1 | 4/2002 | Yajima et al. | |
| 2002/0094090 A1 | 7/2002 | Iino | |
| 2002/0095383 A1 | 7/2002 | Mengin et al. | |
| 2002/0099831 A1 | 7/2002 | Tsunogai | |
| 2002/0128922 A1 | 9/2002 | Joao | |
| 2002/0138771 A1 | 9/2002 | Dutta | |
| 2002/0143860 A1 | 10/2002 | Catan | |
| 2002/0178226 A1 | 11/2002 | Anderson et al. | |
| 2002/0188523 A1 | 12/2002 | Hyyppa et al. | |
| 2003/0023500 A1 | 1/2003 | Boies et al. | |
| 2003/0024988 A1 | 2/2003 | Stanard | |
| 2003/0120502 A1 | 6/2003 | Robb et al. | |
| 2003/0144035 A1 | 7/2003 | Weinblatt | |
| 2003/0163384 A1 | 8/2003 | Hendra | |
| 2003/0225633 A1 | 12/2003 | Sidlo et al. | |
| 2003/0229790 A1 | 12/2003 | Russell | |
| 2004/0006497 A1 * | 1/2004 | Nestor et al. | 705/5 |
| 2004/0039635 A1 | 2/2004 | Linde | |
| 2004/0086257 A1 | 5/2004 | Werberg et al. | |
| 2004/0093309 A1 | 5/2004 | Nakamura | |
| 2004/0128257 A1 | 7/2004 | Okamoto | |
| 2004/0128516 A1 | 7/2004 | Okamoto | |
| 2004/0172270 A1 * | 9/2004 | Sugimoto et al. | 705/1 |
| 2005/0004818 A1 | 1/2005 | Liman | |
| 2005/0021364 A1 | 1/2005 | Nakfoor | |
| 2005/0021365 A1 | 1/2005 | Nakfoor | |
| 2005/0027608 A1 | 2/2005 | Wiesmuller | |
| 2005/0049975 A1 | 3/2005 | Katayama | |
| 2005/0144115 A1 | 6/2005 | Brett | |
| 2005/0149454 A1 | 7/2005 | Chen | |
| 2005/0209914 A1 | 9/2005 | Nguyen et al. | |
| 2006/0003780 A1 | 1/2006 | Mamdani | |
| 2006/0015404 A1 | 1/2006 | Tran | |
| 2006/0020517 A1 | 1/2006 | Brooks | |
| 2006/0080111 A1 | 4/2006 | Homeier Beals | |
| 2006/0081704 A1 | 4/2006 | Boyd | |
| 2006/0082439 A1 | 4/2006 | Bazakos et al. | |
| 2006/0095344 A1 * | 5/2006 | Nakfoor | 705/26 |
| 2006/0097041 A1 | 5/2006 | Funamoto | |
| 2006/0100985 A1 | 5/2006 | Mark | |
| 2006/0111967 A1 | 5/2006 | Forbes | |
| 2006/0124734 A1 | 6/2006 | Wallerstorfer | |
| 2006/0140374 A1 | 6/2006 | Light | |
| 2006/0144946 A1 | 7/2006 | Kuriyama | |
| 2006/0178930 A1 | 8/2006 | Kim | |
| 2006/0293929 A1 | 12/2006 | Wu | |
| 2007/0012765 A1 | 1/2007 | Trinquet | |
| 2007/0143194 A1 | 6/2007 | Fraser et al. | |
| 2007/0192590 A1 | 8/2007 | Pomerantz | |
| 2007/0241189 A1 | 10/2007 | Slavin | |
| 2007/0244731 A1 | 10/2007 | Barhydt | |
| 2007/0244965 A1 | 10/2007 | Dowling | |
| 2007/0244991 A1 | 10/2007 | Dowling | |
| 2007/0260543 A1 | 11/2007 | Chappuis | |
| 2007/0276291 A1 * | 11/2007 | Samovar et al. | 709/225 |
| 2008/0154623 A1 | 6/2008 | Derker et al. | |
| 2009/0030744 A1 | 1/2009 | Yamada | |
| 2009/0101708 A1 | 4/2009 | Kochevar et al. | |

FOREIGN PATENT DOCUMENTS

| | | |
|---|---|---|
| JP | 2001236459 A | 8/2001 |
| WO | WO 98/10361 | 3/1998 |
| WO | WO 99/06928 | 2/1999 |
| WO | WO 99/18533 | 4/1999 |
| WO | WO 99/38129 | 7/1999 |
| WO | WO 00/28485 | 5/2000 |
| WO | WO 01/03040 A1 | 1/2001 |
| WO | WO 01/52139 A1 | 7/2001 |
| WO | 02/27672 A2 | 4/2002 |

OTHER PUBLICATIONS

Article from Website; Sports Venue Technology; "Pacific Bell Park, San Francisco"; (5 pages).

"Acteva and Enspot.com Sign Agreement to Provide On-Line Ticketing, Broader Distribution", Business Wire (Dec. 3, 1999).

"AuctionNet Still One-Of-A-Kind", Automotive News, S12 (Sep. 20, 1993).

"Cathay Pacific Airways Auctions a Boeing 747-400 Worth of Seats in Third Cybertraveler Auction", Business Wire (Apr. 29, 1996).

"Cathay Pacific Airways-USA Receives More than 1,300 Bids During First Five Days of CyberAuction", Business Wire (Oct. 18, 1995).

"Cathay Pacific Airways-USA to Hold First-Ever Internet CyberAuction", Business Wire (Sep. 26, 1995).

"E-TicketBoard Launches PSL Xchange for Eight NFL Teams", PR Newswire (Jul. 18, 2000).

"E-TicketBoard Launches Revolutionary New Site—SeatsandSuites", PR Newswire (Oct. 17, 2000).

"Keyware Unveils Multi-Application Smart Card Suite", Card News, vol. 16, No. 10 (May 30, 2001).

"Online Movie Ticket Site Launched in China", China Online (Dec. 23, 1999).

"OnSale Brings Thrill of the Auction to the Web", Link-up p. 34 (Jul./Aug. 1995).

"Season Ticket Solutions Announces Availability of Ticket Exchange for Sporting Teams and Entertainment Venues", Business Wire (Jul. 30, 2001).

(56) References Cited

OTHER PUBLICATIONS

"WBGH to Hold Online Computer Auction", Link-Up, p. 10 (Sep./Oct. 1988).
Banâtre, "Distributed Auction Bidding System", International Computing Symposium, vol. 4, No. 4 (Aug. 1981).
Banks, "PSL Put Owners on the Hot Seat", St. Petersburg Times, p. 10C (Oct. 31, 1993).
Beam et al, "Electronic Negotiation through Internet-Based Auctions", CITM Working Paper 96-WP-1019, http://haas.berkeley.edu/citm/publications/papers/wp-1019.pdf (Dec. 1996).
Blau, "Dormitories See Departure from Previous Years' Trends", The Tech, vol. 116, No. 38 (Aug. 30, 1996).
Boyes et al, "Auctions as an Allocation Mechanism in Academia: The Case of Faculty Offices", Journal of Economic Perspectives, vol. 3, No. 3, pp. 37-40 (Summer 1989).
Collier, "Columbia, S.C.-Based Internet Firm Helps Buy, Sell Sports Tickets", The State, (Oct. 23, 2000).
Dickey, "Raider PSL Without Permanent Place", San Francisco Chronicle, p. B2 (Jun. 26, 1997).
Dickey, "Raiders' PSLs May Be for Life", San Francisco Chronicle, p. D5 (Mar. 26, 1997).
Fisher, "Secondary Market in Consolidation Mode", Street & Smith's Sports Business Journal, p. 3 (Jul. 23, 2007).
Flint, "Cyber Hope or Cyber Hype?", Air Transport World (Oct. 1996).
Garza, "Space Cruise", Reason (May 2000).
Happel, et al.; "Creating a Futures Market for Major Event Tickets: Problems and Prospects"; *Cato Journal*, vol. 21, No. 3; 2002 (pp. 443-461.
Harlan, "At Least it isn't the Team's Ball that's in Somebody Else's Court", Wall Street Journal (Jun. 4, 1991).
Holbrook, "Oakland, Calif., Professional Football Team Sees Gain in Seat License Sales", Contra Costa Times (Feb. 26, 2001).
Hylton, "Dorm Lottery Starts Strong", The Tech, vol. 114, No. 34 (Aug. 29, 1994).
Jackson, "Media Futures: This Bazaar Could Put Retailers Under the Hammer", Financial Times (May 25, 1995).
Jenkins, "Giants Draw Fans into Web Team Helps Season-Ticket Holders Get Mileage Out of Plans", USA Today, p. 3C (Jun. 27, 2000).
Kasper, "Purchase Griz Playoff Tickets Now", Missoulian Online (May 3, 2001).
Koenig, "Texas Firm Links Sports Teams, Fans", Amarillo Globe-News, Feb. 20, 2000).
Kravets, "Going, Going, Gone! Real Estate Auctions in the 90s", Probate & Property, p. 38 (May/Jun. 1993).
Kroll et al, "The Commodity Futures Market Guide", Harper and Row, pp. 9-10 (1973).
Kumar, "With Stars in their Eyes, Travelers Look to Space", St. Petersburg Times, p. 1A (Jun. 11, 2000).
Labuszewski et al, "Inside the Commodity Option Markets", John Wiley & Sons, pp. 19-21 (1985).
Liao, "Sloan's Class Priority System Set to Go", The Tech, vol. 116, No. 25 (May 10, 1996).
Martin, "LiquidSeats Helps Fill the House, Sans Scalping" cnn.com, (Dec. 14, 2000).
Matsumoto et al, "Feasibility of Space Tourism 'Cost Study for Space Tour'", Proceedings of 40th IAF Congress, Paper IAF-89-700 (1989).
Menezes et al, "Simultaneous Pooled Auctions", The Journal of Real Estate Finance and Economics, vol. 17(3), pp. 219-232 (Nov. 19, 1996).
Moldovanu et al, "The Optimal Allocation of Prizes in Contests", http://www.sfb504.uni-mannheim.de/publications/dp99-75.pdf (Jul. 14, 1999).
Muret, "More Teams Gearing up to Offer Option of Stored-Credit Tickets", Street & Smith's Sports Business Journal, p. 12 (Jul. 9, 2007).

Nestor et al, "Transforming Tickets from a Commodity into a Valuable Strategic Asset", Global eTicket Exchange whitepaper, Oct. 13, 2000.
O'Neil, "Q and A", St. Louis Post-Dispatch, p. 4D (Jan. 19, 1995).
Pelline, "Cathay Pacific to Auction Off Airline Tickets on the Internet", San Francisco Chronicle, p. C4 (Apr. 30, 1996).
Riley et al, "Optimal Auctions", The American Economic Review, vol. 71, No. 3, pp. 381-392 (Jun. 1981).
Rosen et al, "Ticket Pricing", University of Chicago Center for the Study of the Economy and the State (Sep. 1995).
Rubel, "ETM to Ticketmaster: Let's Rock", Marketing News (Jun. 19, 1995).
Shulman, "VICS and Quick Response: Priority Issues for Mass Merchandisers", Supermarket Business, vol. 44, No. 10, p. 13(4) (Oct. 1989).
Stevenson, "Frosh Get at Least Fifth Choice Dorm: Women Find Shortage of Single-Sex Rooms", The Tech, vol. 115, No. 37 (Aug. 31, 1995).
Thomas, "Deadline Looms for Playoff Tickets; PSL Owners Have Until Dec. 8 to Make Purchase", St. Louis Post-Dispatch, p. D8 (Dec. 3, 1999).
Vanderporten, "Strategic Behavior in Pooled Condominium Auctions", Journal of Urban Economics 31, pp. 123-137 (1992).
Waddell, "Advantix, Tickets.com Hope Merger Brings Best of Both Ticketing Worlds", Amusement Business (Feb. 8, 1999).
Wagner, "How Retailers are Using Web Auctions to Let Customers Help Them Set Prices", http://www.internetretailer.com/printArticle.asp?id=3164 (Mar. 2001).
Weiner, "Are the Days Numbered for the Paper Ticket?", Street & Smith's Sports Business Journal, p. 17 (Jun. 18, 2007).
www.TicketOptions.com Web Pages, as retreived from archive.org (2001).
wwwSeasonTicket.com Web Pages, as retreived from archive.org (2001).
Zoltak, "Advantix Acquisitions Continue with Protix Deal", Amusement Business (Nov. 2, 1998).
International Search Report and Written Opinion (dated Apr. 11, 2008); International Application No. PCT/US07/86651; Filed Dec. 6, 2007.
Hes, et al. "At Face Value" On biometrical identification and privacy, Registratiekamer, Sep. 1999; 78 pages.
Fujimura, "XML Ticket: Generalized Digital Ticket Definition Language", The W3C Signed XML Workshop—Copyright © 1999, 33 pages.
Matsuyama, et al. "Distributed Digital-Ticket Management for Rights Trading System", E-Commerce, 1999; pp. 110-118.
In, Shirley Siu Weng, "*A Proposed* Electronic Ticket Management for trading Service in Internet", Feb. 9, 2001; 7 pages.
Article from Smart Card News, "Major Players Form Proton World International", Aug. 1998, pp. 141-160.
Fujimura, et al. "General-purpose Digital Ticket Framework", NTT Information and Communication Systems Labs, USENIX Workshop on Electronic Commerce; Aug. 31-Sep. 1998.
Fujimura, et al. "Digital-Ticket-Controlled Digital Ticket Circulation", NTT Information Sharing Platform Laboratories, USENIX Security Symposium, Aug. 23-26, 1999.
Chui, et al. "Auction on the Internate—A Preliminary Study", Department of Marketing, HK Univiersity of Science and Technology; 1999, pp. 1-7.
Asokan, et al. "SEMPER Consortium: Advanced Services, Architecture and Design", Deliverable D10 of Acts Project AC026, Mar. 15, 1999.
U.S. Appl. No. 09/702,794, filed Nov. 1, 2000.
European Search Report from EP Application No. 07869016.1 dated Oct. 12, 2011, 12 pages.
Canadian Patent Application No. 2670829, Office Action issued on Jun. 25, 2015, 5 pages.

\* cited by examiner

THANK YOU FOR PURCHASING 4 TICKETS TO THE ACME CONCERT.

THE SEATS FOR WHICH YOU HAVE PURCHASED TICKETS ARE LISTED BELOW. PLEASE INDICATE HOW MANY TICKETS YOU WANT ISSUED AND WHAT SEATS ARE TO BE ASSIGNED TO EACH TICKET. PLEASE PROVIDE THE NAME AND ADDRESS (EMAIL OR SMS ADDRESS) OF EACH TICKET RECIPIENT. YOU MAY SELECT THAT RECIPIENT FROM YOUR ADDRESS BOOK.

IF YOU WANT TO ALLOW A TICKET RECIPIENT TO REASSIGN OR FURTHER SPLIT THE TICKET, CLICK ON THE REASSIGN/SPLIT BOX.

☐ ISSUE 1 TICKET   ☐ ISSUE TICKETS AS DESIGNATED BELOW

ROW M, SEAT 23   [ TICKET 1 ]

ROW M, SEAT 24   [ TICKET 1 ]

ROW M, SEAT 25   [ TICKET 1 ]

ROW M, SEAT 26   [ TICKET 2 ]

DELIVER TICKET 1 TO   ☐ ME
   ☐ THE FOLLOWING RECIPIENT   [ ADDRESS BOOK ▶ ]   [ NAME ]   [ EMAIL ADDRESS ]   [ SMS ADDRESS ]
   ☐ AUTHORIZE RECIPIENT TO REASSIGN/SPLIT TICKET

DELIVER TICKET 2 TO   ☐ ME
   ☐ THE FOLLOWING RECIPIENT   [ ADDRESS BOOK ▶ ]   [ NAME ]   [ EMAIL ADDRESS ]   [ SMS ADDRESS ]
   ☐ AUTHORIZE RECIPIENT TO REASSIGN/SPLIT TICKET

[ SUBMIT ]

*FIG. 5*

METHODS AND SYSTEMS FOR ACCESS CONTROL USING A NETWORKED TURNSTILE

CROSS-REFERENCE TO RELATED APPLICATIONS

The present application claims priority from U.S. Patent Application No. 60/873,324, filed Dec. 7, 2006, the content of which is incorporated herein in its entirety.

STATEMENT REGARDING FEDERALLY SPONSORED R&D

Not Applicable

PARTIES OF JOINT RESEARCH AGREEMENT

Not Applicable

REFERENCE TO SEQUENCE LISTING, TABLE, OR COMPUTER PROGRAM LISTING

Not Applicable

BACKGROUND OF THE INVENTION

1. Field of the Invention

The present invention is related to access control, and in particular, to access control to a venue or other location using a networked system.

2. Description of the Related Art

Conventionally, when a user purchases several admissions for a given event, the ticket issuer issues a separate ticket for each admission. Each ticket needs to be distributed by the purchaser to the intended ticket recipients. Disadvantageously, each ticket then needs to be separately inspected or scanned at a venue entry point. Certain ticketing systems instead provide a single ticket for all event admissions purchased by a user. Via such a system, the ticket purchaser and the intended beneficiaries of the ticket admissions disadvantageously need to be together when accessing a venue.

SUMMARY OF THE INVENTION

Certain embodiments relate to access control, such as to a venue or other location. In addition, certain embodiments relate to ticket assignment and issuance. Still further, certain embodiments relate to the splitting of a ticket good for multiple event admissions into two or more tickets.

BRIEF DESCRIPTION OF THE DRAWINGS

FIG. 5 illustrates a first example user interface.

DETAILED DESCRIPTION OF PREFERRED EMBODIMENTS

Figure 1:
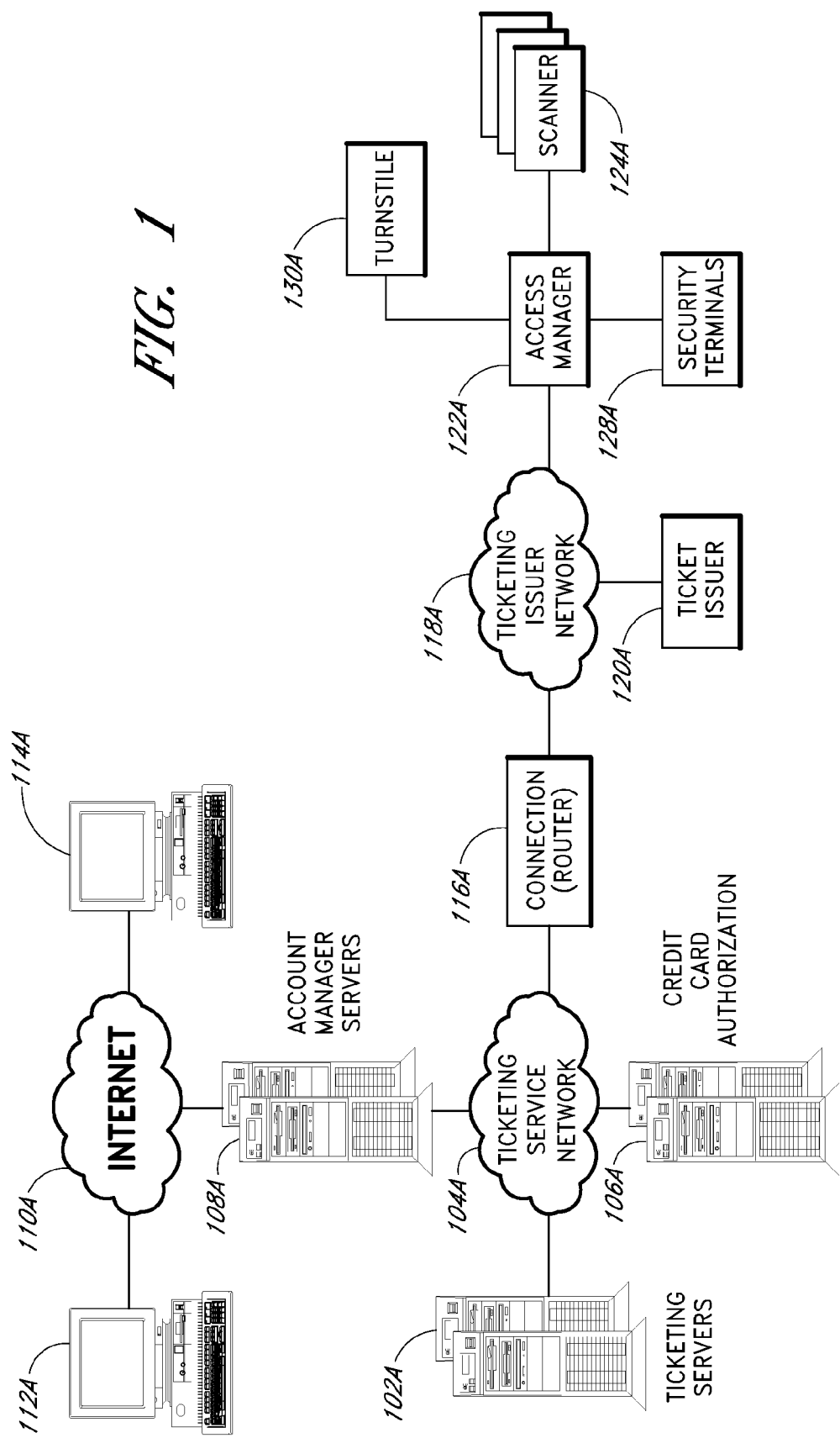
FIG. 1 illustrates a first example networked system.

The present invention is related to access control, and in particular, to access control to a venue or other location.

Certain conventional ticketing systems issue a separate ticket for each admission to an event purchased by a user. For example, if a user purchases 10 admissions to an event, the user will be issued 10 tickets. Disadvantageously, having to keep track of 10 tickets makes it more likely that the user will lose a ticket. Further, the user will have to distribute the tickets to the intended ticket recipients. In addition, when the user and the user's 9 other friends wish to gain admission, a total of 10 tickets will need to be inspected and/or scanned, slowing the admission process and necessitating more access control personnel and/or equipment.

Certain other conventional ticketing systems issue a single ticket for all the event admissions purchased by a user for a given event. Disadvantageously, all those that are to use the ticket to gain admission need to be together when seeking admission to the event venue.

To overcome some or all of the foregoing disadvantages, an example embodiment enables a single ticket to be issued to a user for multiple admissions to an event, for single or multiple admissions to multiple events (e.g., multiple sporting events, such as a season ticket that provides multiple admissions to multiple games), for multiple admissions to one or more reserved areas (e.g., a VIP lounger, a club, parking spaces, etc.), and further enables the user to then split the ticket into multiple tickets (physical and/or electronic) and have one or more of the multiple tickets provided to other attendees associated with the user. Thus, optionally, the number of separate tickets issued when a user purchases multiple event admissions and/or thereafter can be controlled by the user, the ticket issuer and/or by a recipient of a ticket purchased by the user. Further, the number of admissions, associated with the one or more ticket(s), may be modified after the original issuance.

The allocation of admissions/seat assignments may be performed by the user remote from an event venue (e.g., via a Web page accessed from their personal computer, phone, etc.) and/or at the venue. For example, when the user purchases admissions via a ticketing website admissions for multiple events (or multiple groups of seats within the same event), the admissions may be 'attached'/assigned to a machine readable media/document/device, which can act as a ticket. When the media is presented and read at the venue (e.g., via an optical, magnetic, radio frequency, or I/O port reader/scanner as appropriate) the user is presented (e.g., visually via a terminal, such as touch screen terminal, a print out, or by a human gate keeper providing information) with a corresponding list of events/seat blocks. The corresponding list of events/seats block is optionally limited to those events and seats that currently 'active', such as those events/unused seat blocks at the current venue at the current time.

The user selects the desired event/seat block (e.g., by providing a corresponding input to the terminal or by informing a human gate keeper) and is then asked how many individuals are actually entering at this time. The appropriate number of people are then admitted to the event venue (e.g., by a human or automated gate keeper, such as a turnstile or other gate), and an indication is stored in computer readable memory indicating how many people associated with the ticket entered and how many admissions are left.

Throughout the following description, the term "Web site" is used to refer to a user-accessible server site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically-distributed computer systems that are appropriately linked together. Furthermore, while the following description relates to an embodiment utilizing the Internet and related protocols, other networks, such as networked interactive televisions, and other protocols may be used as well.

In addition, unless otherwise indicated, the functions described herein are preferably performed by software including executable code/program instructions running on one or more general-purpose computers. The computers can include one or more central processing units (CPUs) that execute program code and process data, memory, including one or more of volatile memory, such as random access memory (RAM) for temporarily storing data and data structures during program execution, non-volatile memory, such as a hard disc drive, optical drive, or FLASH drive, for storing programs and data, including databases, which may be referred to as a "system database," and a network interface for accessing an intranet and/or Internet. In addition, the computers can include a display for displaying user interfaces, data, and the like, and one or more user input devices, such as a keyboard, mouse, pointing device, microphone and/or the like, used to navigate, provide commands, enter information, provide search queries, and/or the like. However, the present invention can also be implemented using special purpose computers, terminals, state machines, and/or hardwired electronic circuits. In addition, the example processes described herein do not necessarily have to be performed in the described sequence, and not all states have to be reached or performed.

Further, while the term "barcodes" (e.g., linear barcodes, stacked barcodes, matrix barcodes, etc.) and "barcode scanning" may be utilized herein as examples of information and identification encoding and retrieval techniques, other information bearing techniques and corresponding scanning or reading techniques can be used as well. By way of example, other computer readable visual indicia (e.g., dots, concentric circles, text codes hidden within images, text readable using optical character recognition systems, etc.), which may in certain cases be human readable, and other scanners/image capture devices can be used. For example, a scanner/image capture device can be a laser scanner (e.g., including light source, a lens and a photo conductor translating optical impulses into electrical ones), a still frame camera, a video capture device, etc.

By way of further example, magnetic stripes, non-volatile memory, smart chips, wireless transceivers coupled to memory, and/or the like can be used to store information/codes, including ticket identification information, seat information, event information, ticket holder information, ticket issuer information, and the like.

While the following description may refer to "clicking on" a link or button, or pressing a key in order to provide a command or make a selection, the commands or selections can also be made using other input techniques, such as using voice input, pen input, mousing or hovering over an input area, and/or the like. Further, the term "button" as referred to herein can include both software-generated buttons displayed on a screen and physical keyboard buttons, as appropriate.

Certain example embodiments enable a ticket purchaser to receive or access a physical ticket (e.g., paper stock, plastic, a radio frequency identification (RFID) device, optical media, etc.) and/or an electronic ticket (e.g., an admission associated with a driver's license, a credit card, a loyalty/membership card, a numerical code, or an admission code transmitted to a user device, such as a mobile phone, a portable computer, or other device). The ticket may include a barcode (or other computer optically or electronically readable indicia), which indicates that the ticket entitles a designated number of people to enter a designated event/venue (e.g., at a designated time). The ticket may also include indicia that indicate which seats are assigned to the bearer of the ticket. The ticket purchaser (or other authorized person) can then request that the ticket be split into multiple tickets that can be distributed to individual ticket holders designated by the ticket purchaser (or other authorized person), and that are valid for individual entries or for other subset of the originally designated number of people.

By way of illustration, in an example ticket transaction, a user purchases the rights to 10 seats for a given event. A single ticket can be issued to the user that indicates (e.g., via a barcode and/or human readable indicia, via a magnetic stripe, via an RFID tag, via semiconductor memory, and/or otherwise) that ticket holder and 9 people accompanying the ticket holder should be granted admission to an event. Thus, if the user attempts to access an event for the venue for which the ticket was issued, the user and 9 other attendees accompanying the user would be granted access to the event.

Optionally, multiple forms of tickets (a barcode and/or human readable indicia, a card or other carrier including a magnetic stripe storing an electronic ticket or ticket locator, an RFID tag storing an electronic ticket or ticket locator, etc.) may be provided for the same seat or the same sets of seats. For example, optionally a user may use a RFID tag (storing providing the appropriate identifier) and/or a printed ticket to enter venue. Optionally, multiple forms of tickets may be required to enter a venue or specific areas in a venue. For example, both a printed ticket and the credit card that was used for the purchase (and/or a driver's license) may be required for the entrance to the venue.

For example, if the ticket includes a barcode, a magnetic stripe, and/or other computer readable medium, encoded with the data, such as the number of admissions, and/or encoded with a code that can be used to access a corresponding database record indicating the number of admissions the holder is entitled to, the ticket can be scanned by an appropriate scanner/reader (e.g., a barcode reader, a magnetic stripe reader, optical character recognition system that converts human readable characters into computer readable data, etc.). The scanner/reader reads the encoded data, decodes the data and optionally displays the number of admissions to operator/security personnel on an electronic display (e.g., an LCD, OLED, plasma, CRT, projection display system, or other display system) who can then admit the appropriate number of people. Optionally, in addition or instead, the scanner can be coupled to a turnstile or other entry control device (e.g., which allows one person to pass at a time or other designated number of people to pass at a time). The entry control device optionally prevents additional people from entering unless additional authorization is received from the scanner or other source.

Optionally, after the ticket is scanned or otherwise read, a printer coupled to the scanner prints out or otherwise provides a hardcopy ticket (e.g., a paper ticket) or a ticket displayed via a portable electronic device, such as a mobile phone, to each person associated with the scanned ticket. For example, if the scanned ticket indicates that it authorizes the admission of 7 people, then 7 tickets may be printed/transmitted and provided to the corresponding people. These tickets optionally include a seat/section identifier and/or the person's name that are human readable. The hardcopy tickets (or electronic or other forms of tickets) may be used to gain access to certain restricted area and/or to reenter the venue if the ticket holder has left the venue. A special/separate barcode is optionally provided for such access. The ticket may also entitle the holder to access certain areas of the venue (e.g., a VIP area, certain designated seating areas, etc.), or obtain certain concessions (e.g., food).

An example of "splitting" a ticket will now be described. By way of illustration, a user purchases the rights to 10 seats for a given event. As described in the above example, a single ticket can be issued to the user that indicates (e.g., via a barcode and/or human readable indicia, via a magnetic stripe, via an RFID tag, via semiconductor memory, and/or otherwise) that 10 people accompanying the holder of the ticket should be granted admission to an event. In this example, prior to using the ticket to gain admission, the user indicates that he wants the ticket to be divided into two or more tickets.

For example, the user can specify, via a ticketing Web site user interface hosted by a ticketing system (or other interface, such as an interactive voice response (IVR) system), that a separate ticket is to be issued for one of the seats to a designated recipient. Optionally, the user can specify which seat the designated recipient is to be allocated if the event is a reserved seating event. The designated seat is then removed from the pool of seats associated with the ticket issued to the user. The ticket issued to the user in this instance entitles 9 people accompanying the ticket to admission to the event. The ticket issued to the designated recipient entitles the recipient to one entry for the designated seat, if any. Optionally, the foregoing actions can be performed at the event venue, such as when the ticket holder is being accompanied by other people that are seeking admission via the ticket. Optionally, the system enables the user to specify combinations producing more than n tickets for n seats where admission is permitted on a first come first serve basis. Thus, for example, a user may purchase 5 seats for an event, and issue 7 tickets for the 5 seats, where only the first five to show up to the event will be admitted and/or given an assigned seat.

The foregoing are illustrative examples. By way of further example, optionally, the user can specify that 10 separate tickets are to be issued to 10 designated recipients.

By way of further example, a user can purchase an event ticket associated with 10 admissions. When the user seeks admission at the event venue, the number of people (up to 10) being admitted with the user is deducted from the admissions associated with the ticket. If there are remaining admissions associated with the ticket, then the user may send or provide tickets (which may be in the form of electronic or physical/hardcopy tickets) to others so that the remaining number of admissions for the event can be used. For example, the user can email, SMS, or MMS an admission code or a link to an admission code to one or more people (e.g., to their email account, phone, etc.), who can then use the code (or a ticket corresponding to the code) to gain admission to the event venue.

In an example embodiment, optionally, the "original user/ticket purchaser" may have transmitted the code to other users prior to the original user seeking admission to the event. Optionally, the system does not activate the code sent to other users until the original user (e.g., the ticket purchaser or someone authorized by the ticket purchaser) is admitted using the user ticket. Then, the code is enabled and other users may be granted admission on a first come, first serve basis until the admissions purchased for the event by the ticket purchaser are used up. Optionally, the original user can send different codes (or cause different codes/tickets to be sent) to corresponding different recipients, wherein a given code/ticket is associated with a seat selected by the original user from the seats purchased by the original user.

Optionally, the ticket system operator or other authorized personnel can limit the number of admissions that can be associated with a single ticket and/or limit how the ticket may be split. For example, a venue operator may consider it impractical to have more the 6 admissions associated with a ticket, and so provide the ticket issuer with an instruction (e.g., via phone, over a network, via a conventional letter, or otherwise) that no more than 6 admissions are to be associated with a ticket user. The instruction can be provided by a system operator via a user interface hosted by a computer system, stored in the ticketing system memory (e.g., in a customer database), and retrieved when issuing tickets to a user. Thus, for example, if a user wants to purchase 10 tickets, the user would be issued two tickets, each good for admission for 5 people. In other examples, the tickets do not have to have the same number of associated admissions. For example, if a user wants to purchase 10 tickets, the user could specify the admissions-to-ticket allocation or the system can specify the allocation. For example, the user or system can specify that a first ticket is to be associated with 4 admissions, and a second ticket is to be associated with 6 admissions.

The system optionally enables a user (e.g., a ticket purchaser) to submit (e.g., enter into a Web form) certain details (e.g., issuance date, expiration date, alphanumerical identifier, issuer identifier, etc.) for an existing machine readable media (credit card(s), drivers license(s), loyalty cards, or other media), and the admission(s) may be linked (associated) to the media in a database. When the media is read by the system, the seat identifier(s)/number of admissions, ticket holder and ticket purchaser information may be retrieved.

Optionally, a system operator can specify that a given number of admissions can only be assigned to a specified maximum and/or minimum number of tickets (e.g., admission barcodes). For example, a specification can be stored that indicates that a given ticket admission order can only be split into two tickets (or other designated number of tickets). Thus, in this example, if a user purchases 6 admissions, the user can only allocate the 6 admissions among two tickets.

The system optionally monitors a user's "split" instruction (provided via a user interface), and if the user attempts to enter allocation numbers that combined are greater than the number of purchased admissions (or violates some other allocation restriction), the user is so notified by the system via the user interface and is asked to reenter the split numbers. For example, if a user purchased 9 admissions and then attempted to allocate 5 admissions to a first barcode and 5 admissions to a second barcode, the user is notified that the attempted allocation of 10 total admissions exceeds the 9 admissions that were purchased. The user is further instructed to reenter the allocations. Optionally, the user is provided a ticket allocation menu which only includes permitted allocations.

Optionally, a user is enabled to associate a certain number of admission rights to a relatively greater number of users. For example, a user may purchase a group season ticket of 10 seats for a season (e.g., associated with games at a venue of a specified team, plays at a theater, concerts at a concert hall, etc.) and associate the ticket with 20 specified users (e.g., by associating their names, drivers' licenses, credit cards, etc.). Then, for a given season event (e.g., a game, play concert), up to 10 of the 20 users can attend using the ticket.

An account is optionally associated with the group ticket which one or more of the users can be authorized to access and to modify certain account information. A user interface is provided via which the user who initially purchased the ticket (or other designated person, such as a person designated by the initial purchaser) can specify which other users are authorized to access the account and/or assign event admissions to the group's users. Thus, in this example, the assigning user can assign up to 10 admissions for a given event by selecting the desired 10 (out of 20) users via the user interface. For example, the user interface may list the events associated with the ticket account. The user can select a given event. The user interface presents the names (or other identifiers) associated with the group.

Optionally, the ticket purchaser is requested to or can offer to provide contact information (e.g., a physical address, an email address, an SMS/MMS address, a phone address, and/or instant messaging address) for the ticket purchaser and ticket recipients (e.g., designated recipients that are to be issued tickets that grant admission). A ticket can then be sent to a ticket recipient to a designated recipient address in electronic and/or physical form.

By way of example, as similarly discussed above, a ticket can be an electronic ticket transmitted to the user/recipient over a network (e.g., via email to the ticket purchaser/recipient terminal, downloaded from a Web site by the ticket purchaser/recipient via a browser, transmitted to a wireless cell phone, etc.) with one or more embedded seat identifiers/number of admissions, ticket holder identifier, ticket purchaser identifier and/or a unique ticket identifier.

Should an event or service corresponding to a ticket be cancelled or postponed, optionally the ticket purchaser and/or each designated recipient is notified via a message transmitted to an address associated with the notification recipient. For example, the notification can be transmitted via email, SMS message, MMS message, instant message, phone, letter/postcard, and/or via other communications.

FIG. 1 illustrates example hardware components and example software components that can be invoked during the processes described herein. An example ticketing system operated by a ticket processing service or other entity can include one or more ticketing servers 102A, account manager servers 108A, a credit card authorization system 106A, a network 104A (which can be an intranet or the Internet or other data network), and a router 116A. The ticketing system can host a Web site accessible by users for purchasing, selling, splitting, consolidating, and/or transferring tickets. The Web site may optionally include content that spans multiple Internet domains, and/or may be implemented using physical servers that are geographically remote from one another. A legal engine optionally resides on one or more of the foregoing systems to ensure that ticket postings and sales comply with applicable governmental or other regulations (e.g., security related regulations, anti-scalping laws, etc.).

As depicted, users access the ticket processor ticketing system over the Internet 110A (or other network, such as an interactive television network) using respective terminals 112A, 114A, which can be personal computers. In addition or alternatively, users can access the ticketing system via other general-purpose computers that have access to the Internet, via networked personal digital assistants, phones, interactive televisions, or other user terminal types. The user terminals 112A, 114A optionally execute commercially-available Web browser applications, such as those which implement the basic World Wide Web standards such as HTTP and HTML, or other types of applications that access data from networked sites.

The user terminals 112A, 114A may also host/execute or provide access to email applications, such as Microsoft Outlook®, which may be used to receive communications from and send communications to the ticketing system. The e-mail application and the browser may be integrated with one another, and/or may be integrated with other application programs or the operating system. The terminals 112A, 114A can include displays, keyboards, memory storage devices, printers, network interfaces, and the like. The user terminals 112A, 114A can also be configured to receive SMS/MMS and/or instant messaging communications.

The ticket processing ticketing system can include one or more databases, such as a user account database, that stores some or all of the following: user contact information, billing information, identification information/codes (e.g., driver license number, passport number, date of birth, city of birth, mother's maiden name, pet name, etc.), copies of identification documents (e.g., electronic copies of a driver license, state identification card, etc), preferences, account status, a database of user contacts (e.g., including the names and contact information for friends, family, and/or business associates), biometric data (e.g., a fingerprint, a voice scan, a vein scan, a palm scan, image data, etc.) and the like, that can be accessed by other portions of the ticketing system, such as by account manager servers 108A.

Similarly, one or more ticket databases accessible by the ticketing system can include ticket information records for tickets, including barcode information, event name (or event names where there are multiple events associated with the ticket), event date(s), seat identifier(s), ticket holder name(s) or other identifier of a current ticket holder or holders, names or other identifiers of past holders of the ticket, ticket purchaser name or other identifier of most recent ticket purchaser, names or other identifiers of past purchasers of the ticket, an indication as to how many admissions for one or more events are associated with a given ticket, an indication as to how many events are associated with a given ticket, an indication as to whether a ticket has been divided out or combined (e.g., that the number of admissions associated with a ticket has been decreased or increased), an indication as to how many separate tickets for an event are associated with an identified user, a ticket valid/invalid indicator, and an indicator as to whether the ticket has been used, an indicator regarding how many admissions associated with the ticket have been used, an indicator as to whether the ticket purchaser (or someone designated by the ticket purchaser) has been admitted to a ticketed event, an indicator as to whether tickets/codes sent by or on behalf of the ticket purchaser are enabled, etc.

As further depicted by FIG. 1, a ticket issuer, which can be a sports team, venue operator, ticketing agency, or the like, accesses the ticketing system via the router 116A. The ticket issuer can have a ticket issuer ticket system 120A that hosts an application, such as Ticketmaster's commercially available Archtics™ application, that is used to define events, set ticket prices, set ticket issuance rules (e.g., including an indication as to the restrictions, if any, on how many admissions and/or events can be associated with a ticket), and/or provide real-time integration with the ticket processor ticketing system. In addition, via the system 120A, the ticket issuer can optionally define customized invoices, tickets, receipts, labels, and other correspondence. The system 120A optionally allows the ticket issuer to define at least portions of the Web pages or other user interfaces that will be displayed to users, such as by defining logos, fonts, colors, and the like.

The system 120A is connected to an intranet and/or the Internet 118A to thereby access the router 116A, access management system 122A, and to receive data from a reading device 124A (e.g., a barcode scanner, a character reader, a smart card reader, an RFID reader, etc.) that optionally scans tickets (which can be a physical ticket or an electronic ticket, such as one stored in a mobile phone and displayed by a mobile phone display) or otherwise receives ticket information (ticket codes, ticket holder codes, and/or ticket purchaser codes) from a user ticket-bearing device. The reader 124A optionally is also configured to read one or more types of identification devices (e.g., driver license magnetic stripe, passport RFID tags, etc.). The reader 124A optionally includes a biometric scanner configured to read one or more physical attributes of a ticket holder (e.g., fingerprint, palm, veins, retina, voice, face, body, etc.).

The access management system 122A, an example of which is the server-based Access Manager™ system that is commercially available from Ticketmaster, is used to authenticate tickets proffered at an event venue, and optionally to determine how many admissions and/or events the ticket entitles a user to. Optionally, the access management system 122A provides a user interface (e.g., displayed to the user or other operator via a terminal) via which the user can indicate how many admissions associated with a ticket the user wants to utilize (e.g., for those physical accompanying the user) and/or if any admissions are to be transferred/sent to others, and if so, how (e.g., via an email, SMS, or MMS address specified by the user).

If an invalid ticket (or other media) is presented (read/scanned) for entry, a notification or alert to that effect is optionally provided to a gate keeper and transmitted to one or more security terminals 128A. The access management system 122A is optionally coupled to a turnstile 130A. The access management system 122A optionally enables the turnstile 130A to turn or otherwise admit an appropriate number of people to a venue corresponding to if a valid ticket, or media is presented (e.g., where the ticket is read or scanned and authenticated). The management system 122A optionally also receives an indication as to when and/or how many people have passed through the turnstile 130. Once the appropriate number of people has passed through the turnstile(s), the turnstiles will not turn or otherwise admit additional attendees until further authorization to do so is received. A venue optionally has a plurality of turnstiles 130 and/or reading devices 124A.

Optionally, the reading (e.g., scanning) may be monitored and/or performed by the gate keeper/ticket taker. After the barcode (or other indicia) is read/scanned (e.g., a group barcode), the system 122A displays (e.g., via a handheld or fixed terminal) the number of remaining entrances allowed for the group ticket and prevents or instructs someone to prevent additional members of the group (if any) from entering once the number reaches zero. If a networked turnstile is used, the ticket taker may enter the number of entrances in the handheld terminal, and the system "opens" the turnstile the appropriate number of times for the appropriate number of admissions. Optionally instead, the ticket-taker may scan the same barcode for each attendee associated with the barcode (e.g., 10 times for 10 attendees associated with the group ticket).

The access management system 122A enables a user (e.g., a ticket purchaser and/or a system operator) to 'de-authorize' or modify the number of entries for a specific indicia. For example, if a ticket purchaser has "attached" her tickets to an RFID card and subsequently lost the card, the number encoded in the card could be 'de-authorized' and the ticket re-issued to another indicia.

The access management system 122A can optionally generate reports tracking attendance, entry traffic by time, intervals, rejected admission attempts, and admissions by entry point, ticket type and/or price code when applicable.

By way of example, the ticket issuer ticketing system 120A generates ticket barcodes and/or human readable data. Optionally, each event/seat(s)/print-count combination is associated with a unique barcode. A print count is the number of times tickets for an individual seat location has been issued. Optionally, a ticket is also associated with a ticket holder whose name and/or other identification information is provided on the ticket in barcode, magnetic, solid state memory, and/or human readable format.

The ticket issuer (or its agent) sells tickets, such as concert or sporting event tickets, in the form of single event tickets (where a ticket can optionally authorized multiple admissions to an event) or season tickets, to a first user, either directly or via the ticketing service ticket processing system. For example, the first user can initiate and complete the purchase via the user terminal 114A and can further authorize payment via a credit card, debit charge, or otherwise. The first user can then use the terminal 114A to post, via the account manager 108A, one or more of the tickets for sale on the Web site hosted by the ticketing system or to assign the tickets to another (e.g., as a gift). A record of the posting can be stored in the ticket database, which can be stored on the ticketing system 120A, the account manager servers 108A, and/or the ticketing servers 102A. As discussed above, the first user optionally can instruct the system to send a purchased ticket to a recipient.

A second user can initiate, authorize payment, and complete a purchase of one or more of the posted tickets via the user terminal 112A. If the second user is paying by credit card, the credit card authorization system 106A checks to make sure the credit card is authorized and has not exceeded its credit limit. The system can also receive and verify other identification data provided by the second user for the second user and/or for others to whom the second user is allocating tickets. The ticketing system 120A invalidates the first user's admission rights and the original ticket for which admission rights have been purchased by the second user. An invalidation indicator is stored in association with the barcode information in the ticketing system database, as well as in a database associated with the access management system 122A. Thus, if someone tries to use the original, first user's ticket to access the corresponding event or game, the original ticket's barcode will be scanned using the barcode reader 124A. The access management system 122A will compare the scanned barcode information with that stored in the access management system database, and via the invalidation indication determine that the ticket has been invalidated or cancelled. The holder of the original ticket can then be denied entry to the event. If the first user had one or more tickets issued to recipients corresponding to the original ticket, then those tickets are invalidated as well. A notification is optionally sent by the ticketing system to the ticket recipients regarding the invalidation of their tickets.

If only a portion of the admissions associated with a ticket has been resold, then optionally a new ticket is issued to the ticket recipient that is associated with a reduced number of admissions. In such a case, the number of admissions associated with the original tickets may be reduced to the appropriate number of admissions (e.g., as indicated by corresponding admissions data stored in a database in association with a ticket identifier). Thus, the original barcode is not invalidated as a whole, but the number of allowed admissions may be reduced. Optionally instead, a new barcode may be generated for the original purchaser and the original barcode is invalidated/associated with zero admissions.

Optionally, two or more of the ticketing servers 102A, account manager servers 108A, credit card authorization system 106A, ticketing system 120A, and access management system 122A, can be co-located and/or hosted by the same computer system.

As similarly discussed above, an example ticket delivery option that can be used by the system illustrated in FIG. 1 is electronic delivery. By way of example, electronic delivery can send or deliver a ticket, or a manifestation of a ticket (which, will also be referred to as a "ticket"): (a) inside an email, (b) as an attachment to an email, (c) as a download from a web site, (d) as an SMS or MMS message to a mobile cellular/WiFi/VoIP phone, (e) via a kiosk and will call pickup, (f) by associating admission rights with a user credit card number, driver's license, other machine readable media or other personal identifier, or (g) otherwise. The user can then, as appropriate, print the electronic ticket (including a user identifier), have the ticket displayed using the mobile for use at a venue, or the corresponding information can be wirelessly (e.g., using radio frequency or magnetic communication) transmitted to the venue's ticketing apparatus so that an operator can receive the ticket information. The system can track when the ticket is sent, received or accepted and store such information in the system database. Optionally or in addition, the ticket can be mailed as a physical ticket via the postal service, courier service, or otherwise. If a buyer is purchasing from a previous purchaser multiple tickets for an event for the buyer's use and/or for others (e.g., as a gift, or purchasing on their behalf), then, optionally, all the purchased tickets are electronically or physically provided to the buyer with the number of admissions provided thereon.

Figure 2:
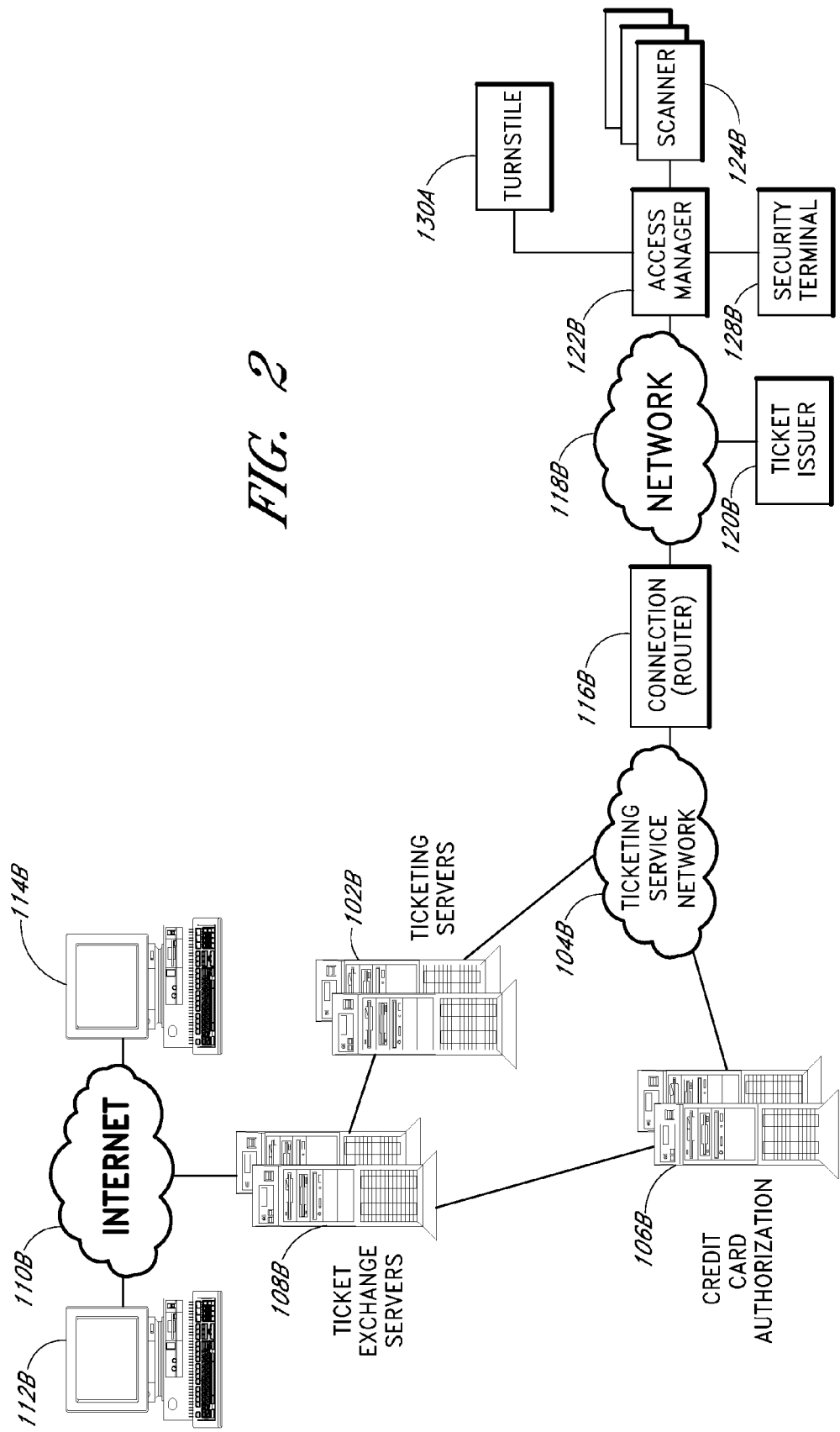
FIG. 2 illustrates a second example networked system.

FIG. 2 illustrates another embodiment of example hardware components and software components that can be invoked during the processes described herein. An example ticketing system operated by a ticket processing service or other entity can include ticketing servers 102B, ticket exchange servers 108B, a credit card authorization system 106B, a network, 104B, and a router 116B. As depicted, in this embodiment the ticket exchange servers are connected directly to the ticketing servers 102B and the credit card authorization servers 106B. The illustrated example system otherwise operates as similarly described above with respect to FIG. 1A.

A legal engine optionally resides on one or more of the foregoing systems to ensure that ticket postings and sales comply with applicable governmental or other regulations. As similarly discussed above with respect to FIG. 1, the ticketing system illustrated in FIG. 2 can host a Web site accessible by users for purchasing, selling, and transferring tickets. The Web site may optionally include content that spans multiple Internet domains, and/or may be implemented using physical servers that are geographically remote from one another.

As depicted, users access the ticket processor ticketing system over the Internet 110B (or other network) using respective user terminals 112B, 114B (e.g., networked personal computers, personal digital assistants, phones, interactive televisions, or other user terminal types). The user terminals 112B, 114B may run commercially-available Web browser applications, such as those which implement the basic World Wide Web standards such as HTTP and HTML, or other types of applications that access data from networked sites.

The user terminals 112B, 114B may also run an email client (e.g., a commercially available e-mail application, such as Microsoft Outlook®), which may be used to receive communications from the ticketing system. The e-mail application and the browser may be integrated with one another, and/or may be integrated with other application programs or the operating system. The user terminals 112B, 114B can also be configured to receive SMS/MMS and/or instant messaging communications. The terminals 112B, 114B can include displays, keyboards, memory storage devices, printers, and the like.

Similarly, one or more ticket databases accessible by the ticketing system can include ticket information records for tickets, including barcode information, event name, event date, seat identifier(s), ticket holder name(s) or other identifier of a current ticket holder or holders, names or other identifiers of past holders of the ticket, ticket purchaser name or other identifier of most recent ticket purchaser, names or other identifiers of past purchasers of the ticket, an indication as to how many admissions are associated with a given ticket, an indication as to whether a ticket has been divided out or combined (e.g., that the number of admissions associated with a ticket has been decreased or increased), an indication as to how many separate tickets for an event are associated with an identified user, a ticket valid/invalid indicator, and an indicator as to whether the ticket has been used.

As further depicted by FIG. 2, a ticket issuer, which can be a venue operator, an artist, a promoter, a ticketing agency, a user reselling tickets, or the like, accesses the ticketing system via the router 116B.

The system 120B is connected to an intranet and/or the Internet 118B to thereby access the router 116B, access management system 122B, and to receive data from a reader 124B. The access management system 122B, an example of which is the server-based Access Manager™ system that is commercially available from Ticketmaster, is used to authenticate tickets proffered at an event venue, and optionally to determine how many admissions the ticket entitles a user to. If a ticket fails to authenticate, optionally a notification or alert to that effect is provided to a gate keeper and transmitted to one or more security terminals 128B. The reader 124B optionally includes a barcode scanner, a character reader, a magnetic card reader, and/or a camera, which reads/scans tickets for ticket codes, ticket holder codes, and/or ticket purchaser codes. As similarly discussed above with respect to FIG. 1, the reader 124B optionally is configured to read one or more types of identification devices (e.g., a barcode scanner, a character reader, a smart card reader, an RFID reader, etc.) and to optionally read tickets (which can be a physical ticket or an electronic ticket, such as one stored in a mobile phone and displayed by a mobile phone display) or otherwise receives ticket information from a user ticket-bearing device for ticket codes, ticket holder codes, and/or ticket purchaser codes. The reader 124B optionally includes a biometric scanner configured to read one or more physical attributes of a ticket holder (e.g., fingerprint, palm, veins, retina, voice, face, body, etc.).

The access management system 122B enables a user (e.g., a ticket purchaser and/or a system operator) to 'de-authorize' or modify the number of entries for a specific indicia. For example, if a ticket purchaser has "attached" her tickets to an RFID card and subsequently lost the card, the number encoded in the card could be 'de-authorized' and the ticket re-issued to another indicia.

The access management system 122B can optionally generate reports tracking attendance, entry traffic by time, intervals, rejected admission attempts, and admissions by entry point, ticket type and/or price code when applicable.

As similarly discussed above with respect to FIG. 1, the access management system 122B utilizes the barcode information scanned from a ticket using the reader 124B to perform the authentication and to determine how many people are entitled to admission with respect to a given ticket. The access management system servers can optionally use a database and/or an encryption/decryption algorithm for ticket identification lookup. The system optionally enables a ticket purchaser to resell a ticket to another user, as similarly discussed above, with the original ticket being invalidated.

Optionally, two or more of the ticketing servers 102B, ticket exchange servers 108B, credit card authorization system 106B, ticketing system 120B, and access management system 122B can be co-located and/or hosted by the same computer system.

Figure 3:
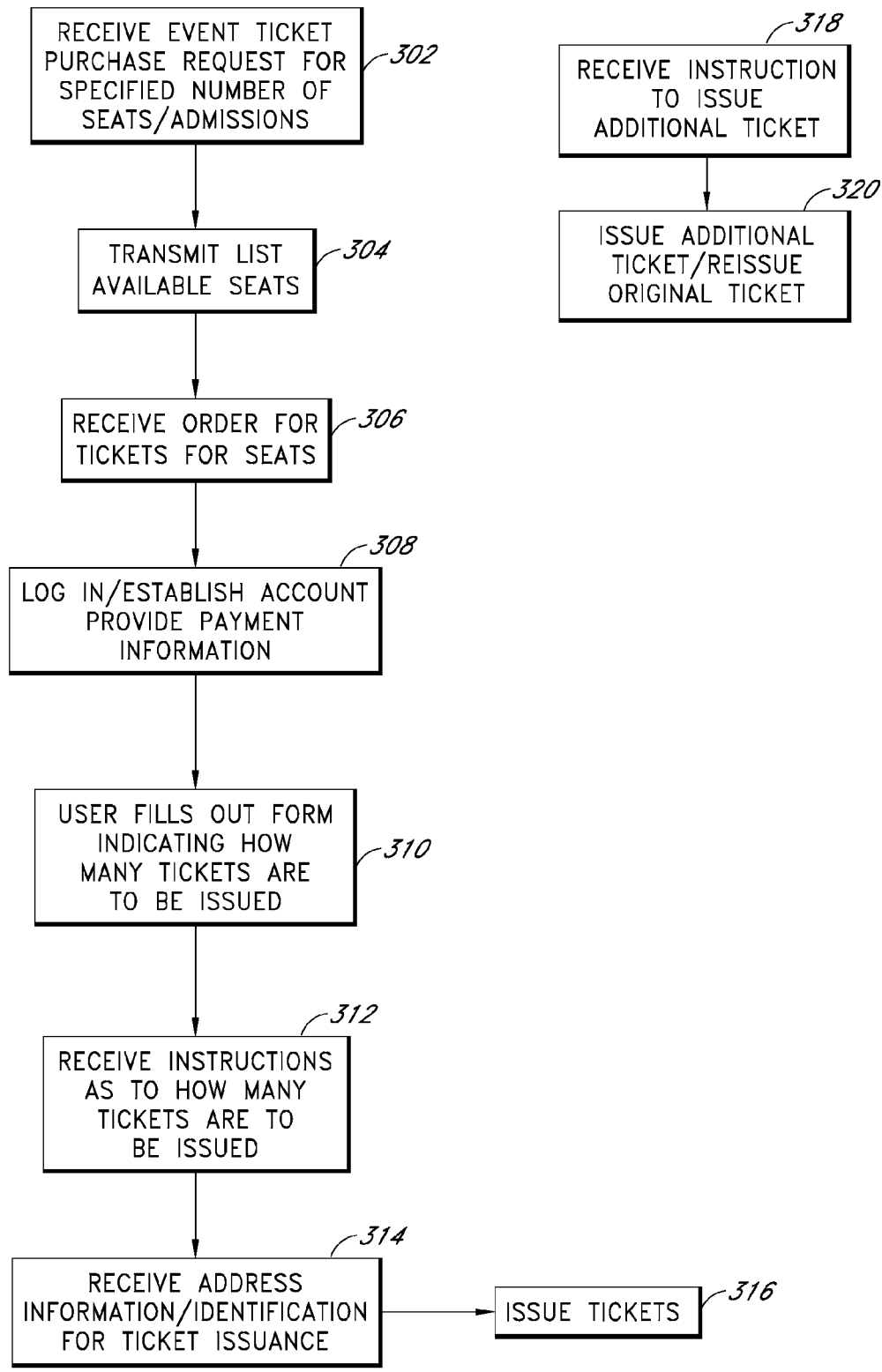
FIG. 3 illustrates a first ticket purchase and issuance example process.

FIG. 3 illustrates an example process for processing a ticket purchase request and issuing tickets. At state 302, a ticket request for an event (or for multiple events, such as for a sports season) is received from a user (e.g., from a user terminal, phone, or ticket kiosk) over a network (e.g., the Internet) at a ticketing system. The ticket request can be for one or more seats at a selected price level, a selected seating area, or for the best available seats (optionally, if tickets are being ordered for multiple events, the user interface can enable the user to specify different seat requests for different events). In this example, the request is for five tickets. At state 304, the ticketing system locates five available seats meeting the user's request and transmits information regarding the seats (e.g., the price, section, row, and seat) for display to the user (e.g., to the user's terminal or a ticket kiosk being used by the user). The user can elect to proceed with the purchase of the offered seats, abandon the ticket request, or request a new selection of seats.

In this example, at state 306, the user accepts the offered seats, and proceeds with the order. The ticketing system receives the order over the network and requests that the user provide payment information (e.g., a credit card number), or payment information is accessed from the user's account information. At state 308, if the user has not already done so, the user may be asked to log-in (e.g., by providing a password and/or user ID) or establish an account (e.g., provide name and contact information, select a user ID and/or password).

At state 310, the user can specify, via a form, how many separate tickets are to be issued, which seats are to be associated with a given ticket, and to whom the tickets are to be delivered to (optionally, if tickets are being ordered for multiple events, the user interface can enable the user to specify different ticket issuance instructions for different events). For example, if a user is purchasing tickets for 5 seats (Q13, Q14, Q15, Q16, Q17), the user can specify that 3 seats (Q13, Q14, Q15) are to be associated with a first ticket issued to the user, and that 2 seats (Q16, Q17) are to be associated with a second ticket issued to the user's friend, Jane Doe. Optionally, as a default, separate tickets are issued to the user for each purchased admission. Optionally instead, as a default, a single ticket is issued to the user for all purchased admissions. The default can be set by a system operator and/or the user via an account management user interface.

At state 312, the system receives over the network the user's issuance instructions (e.g., how many tickets are to be issued and to whom). The system optionally asks the user to provide identification information, such as a name and/or other identification information, for the intended user/recipient of each purchased admission. For example, if supplementary identification information is desired (e.g., information beyond the recipient name), the ticketing system optionally transmits a form including list of one or more acceptable forms of supplementary identification (e.g., a driver license, an account identifier, a credit card number, etc.) to the user (e.g., to the user's terminal or a ticket kiosk). The form can include fields to receive the identification information. The system optionally requests contact information (e.g., an email address, SMS address, instant messaging address, physical mailing address, etc.) for recipients that are to receive tickets. As discussed above, optionally the foregoing instructions can be provided at a later time, such as at the event venue as the user is being admitted to the event (or just before or after).

At state 314, the system receives the ticket issuance and address information. At state 316, tickets are issued in accordance with the user's instructions and/or system defaults/rules. For example, as similarly described above, the tickets can be emailed to a terminal, downloaded from a Web site to a terminal, transmitted to a wireless cell phone, mailed to the designated recipients (e.g., the purchaser and recipients designated by the purchaser). If the ticket is electronically transmitted, the recipients can optionally print out the tickets. The appropriate admission information (e.g., how many admissions the ticket holder is entitled to) is optionally encoded/stored on the delivered/printed ticket (e.g., encoded in a bar code, other computer readable indicia, and/or in human readable indicia).

If there are future notifications regarding the event (e.g., an event cancellation, a ticket cancellation, a change of date, a change of venue, etc.) the notifications can be provided (e.g., via email, an SMS/MMS message, an instant message, regular mail, etc.) to the ticket purchaser and/or the ticket recipients.

At state 318, the ticket purchaser accesses a user interface (e.g., a Web page, interactive voice response system, or other interface) and instructs the system to issue an additional, separate ticket for one of the previously purchased seat. For example, with reference to the example described above, the user can specify that seat Q15 is to be issued to John Smith. The first ticket will now only be good for two admissions. At state 320, a third ticket for the event will be issued to John Smith for seat Q15. Optionally, the first ticket is reissued to the ticket purchaser (e.g., as a fourth ticket) with indicia indicating that it is good for two admissions, and the system stores an indication in computer readable indicating that the originally issued first ticket is no longer valid.

Figure 4A:
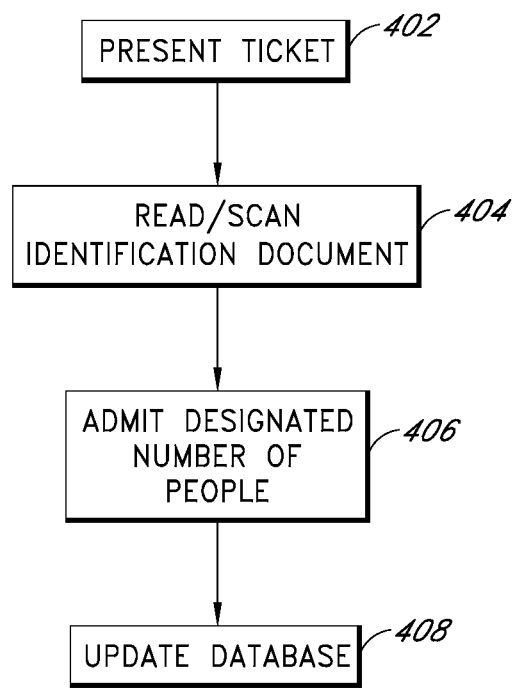
FIG. 4A illustrates an example venue admission process.

FIG. 4 illustrates an example process executed upon presentation of an event ticket at the event venue. At state 402, a ticket holder presents a ticket to a gate keeper (e.g., a human ticket taker, an electronic turnstile, etc.). At state 404, data stored/printed on the ticket is read/scanned by an electronic reader and/or read by a gatekeeper. For example, the ticket can have the number of admissions the ticket is authorized for printed in human and/or computer readable indicia. By way of further example, the ticket can have a ticket identifier and the names of other identifiers of those who are to be admitted using the ticket printed thereon in human readable and/or machine readable format, in encrypted or in unencrypted form. The number of admissions associated with the ticket is optionally displayed on a display coupled to a ticket scanner. The human ticket taker may enter the number of users actually entering with the given ticket, and if the number entering is less than the total assigned to the ticket then the remaining entries will be available for a subsequent scan of the ticket.

At state 406, the appropriate number of users is admitted. Optionally, a ticket printer located at the gate keeper location prints a separate ticket or otherwise provides an access device for each guest being admitted. The printed tickets can be used to access the guest's seat or other event area and/or to gain re-admittance to the event in case the guest left the event (e.g., to go to the guest's car of for other reason). At state 408, a ticket database record is updated to indicate that the ticket has been used and how many people were admitted in association with the ticket.

Figure 4B:
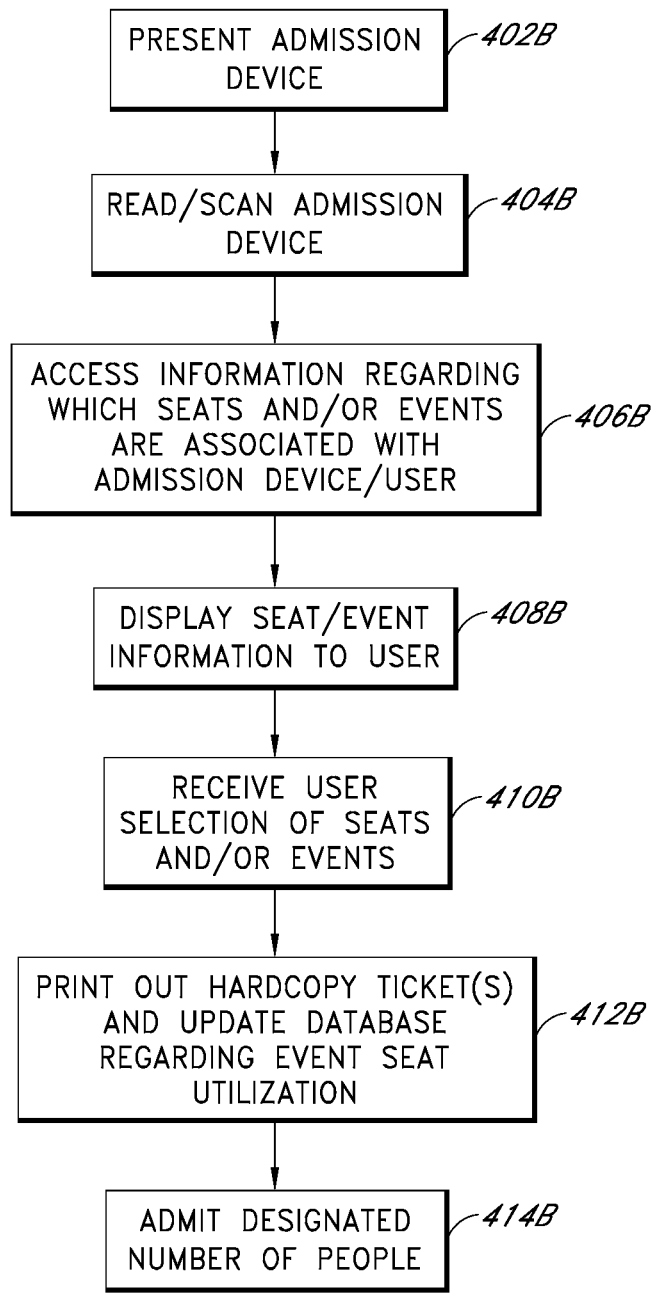
FIG. 4B illustrates another example venue admission process.

FIG. 4B illustrates another example process executed upon presentation of an admission device at the event venue. While the following example assumes that the event is a reserved seat event, optionally the event can be a general admission event wherein a user is not provided with a specified seat.

As similarly discussed above, the admission device can be in the form of a hardcopy ticket (e.g., including an identification barcode), a preexisting personal identification device (e.g., a driver's license, a credit card, a loyalty/membership card associated with a specified number of event admissions), a code stored in a smart card, a code stored in a phone (e.g., a barcode or a code intended to be transmitted to a receiving device using radio frequency communication), a code stored in an RFID device, etc. Optionally, rather than, or in addition to using an admission device, a human readable code (e.g., an alphanumeric code) originally issued by the ticketing system to the user and manually entered via a keyboard or spoken by the user can be utilized.

At state 402B, the user presents/provides the admission device at the event venue to a gate keeper (e.g., a human ticket taker, an electronic turnstile, etc.). By way of example, the user may be the original ticket purchaser or a person that the original ticket purchaser designated as a recipient. The admission device and/or the user can be associated with multiple event seats and/or multiple events. At state 404B, one or more codes and/or other data printed/stored on the admission device are read (e.g., via a barcode reader, a magnetic stripe reader, an RFID reader, or other reader appropriate to access the code from the admission device).

At state 406B, the system utilizes the code/information accessed from the admission device to determine whether the bearer is authorized to assign seat allocations for seats associated with the admission device, how many seats for the event and/or how many events are associated with the admissions device (and/or the user). For example, the admission device can store the seat identifications and event identifications and/or the admission device can store a code that can be utilized to locate the seat identifications and event identifications stored in a system database.

At state 408B, if the user is authorized to assign seat allocations, the system outputs the seat identifications (optionally, just those seats for the event taking place at the venue on the day the user presents the admission device) and/or event identifications for display to the user via a terminal (e.g., a terminal with a touch screen and/or a keyboard) or to a human operator interacting with the user.

If the user is not authorized to assign seat allocations (e.g., where the user is not the ticket purchaser, and the ticket purchaser did not authorize the user to make seat allocations), optionally the user will only be issued a seating ticket for a seat allocated to the user by the original ticket purchaser (or other person so authorized). If no seat has been allocated to the user, optionally the system will randomly assign one of the seats purchased by the original purchaser and associated with the ticket, or automatically assign a seat based on an order specified by the purchaser or a system operator (e.g., assign seat furthest from the aisle first, then the adjoining seat, and so on (e.g., to make it easier for later arrivals to get to their seat without having to step over or around earlier arrivals); or assign center seat in the associated seats first, then seats to one side of the center seat, and then seats to the other side of the center; or assign highest ranked/quality seat first (e.g., seat closes to center stage), then next highest ranked seat, and so on (so that earlier arrivals are awarded with better seats), or otherwise.

Optionally instead, if no seat has been specifically allocated by the original purchaser (or other authorized person) to the user, the user is asked to wait until the original purchaser (or other authorized person) makes the allocation (even though an admission has been allocated to the user).

At state 410B, the user selects which seats and/or event admissions the user wants to utilize. For example, the admission device/user may be associated with 6 admissions/seats for an event. The user may be physically accompanied by two other people. The user thus may elect to use three of the event admissions at this time, and leave three remaining admissions/seats for other people designated by the user (e.g., via the terminal or by sending the other people electronic tickets).

At state 412B, the system optionally prints out hardcopy tickets (e.g., on paper, cardboard, cloth, or plastic stock) for each person being admitted using the admissions associated with the admission device. For example, the hardcopy ticket can indicate which seat and/or section the bearer is entitled to utilize for the event and optionally can enable the bearer to leave and then reenter the venue during the event. Optionally, the hardcopy ticket can also enable the bearer to gain access to certain restricted areas aside from a reserved seat. For example, the hardcopy ticket can be used to gain access to a VIP room, as a backstage pass, etc. Optionally, in addition to or instead of the hardcopy ticket, an electronic ticket can be distributed to one or more of the people being admitted.

The system updates its database and/or information stored on the admission device to reflect the utilization of the event seat tickets to thereby ensure that tickets for the same event seats are not issued to another person, and to indicate that the 3 admissions have been "used up" so that the user and her guests will not receive more admissions than paid for.

At state 414B, the appropriate numbers of people are admitted to the event venue, optionally through a networked turnstile/gate enabled to admit the appropriate number of people.

FIG. 5 illustrates an example user interface configured to receive from a ticket purchaser allocations of admission to tickets, and contact information and/or identification information as to whom the tickets are to be sent to. The received information can be stored in a ticket system database. The user interface optionally is accessed by a user terminal via a Web site hosted by a ticketing system, such as that described above.

The form lists the number of admissions, and for a reserved seat event, seat information (e.g., row, seat number, section, etc.) corresponding to the purchased admissions. A ticket allocation field is provided via which the user can assign an admission/grant of a seat to a ticket. For example, a drop down menu is optionally provided from which the user can select a ticket with which an admission is to be associated (e.g., Ticket 1, Ticket 2, Ticket 3, etc.).

A "deliver ticket to" area of the user interface enables to the user to specify to whom tickets are to be delivered. A field is optionally provided via which the ticket purchaser can manually enter the name of the intended recipient of an admission/ticket. An address book field is optionally provided with a drop down menu that, when activated, causes names in an address book associated with the purchaser to be presented. In this example, the user can optionally select a ticket recipient from the presented names. A field is optionally provided via which the ticket purchaser can manually enter the name of the intended recipient of an admission. An email field and an SMS field are provided via which the purchaser can enter corresponding email and SMS addresses for the recipient. Optionally, additional or different contact fields can be provided (e.g., an instant messaging address, a physical address, a phone number, etc.).

An "authorize recipient to reassign/split ticket" checkbox field is optionally provided. If the checkbox is checked, the right to further split the ticket (e.g., have a separate ticket for an admission issued to a designated recipient) and/or to transfer the ticket and associated admission right, will be provided to the initial ticket recipient. If the checkbox is not checked, then the recipient will not be entitled to further split/transfer the ticket.

Optionally, one or more rules may be stored in the system that prevents or prohibits ticket recipients from splitting the ticket. The rules may be specified by the system operator, the venue operator, a performer, a government entity, and/or other entity. For example, a rule may be a system-wide rule that specifies that a ticket split cannot be performed within a designated period of the ticketed event (e.g., which 24 hours, within 12 hours, within 6 hours, or other specified period). If a rule prevents such a split, optionally the split allowed checkbox is not presented or is disabled (e.g., grayed out).

Figure 6:
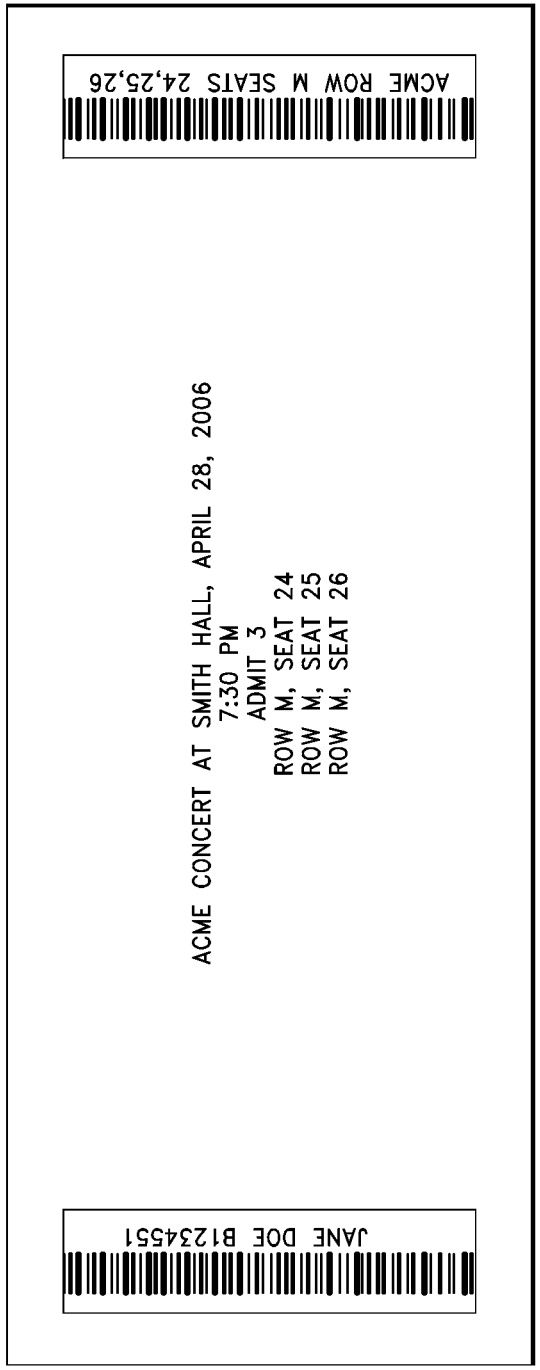
FIG. 6 illustrates an example ticket.

FIG. 6 illustrates an example ticket. The event name, venue name, and event date and time are provided on the ticket. In addition, the number of admissions (e.g., 3) the ticket is good for is provided thereon. The ticket further includes seat identifiers corresponding to the ticket.

Thus, certain example embodiments enable a user and/or system operator to flexibly assign admissions to a ticket, split admissions into multiple tickets, combine admissions into a single ticket, and/or to forward tickets.

While certain of the above example embodiments describe purchasing tickets at a set price, the processes and apparatus described above can be used with respect to auctioned tickets or tickets given away for free. Further, certain process and apparatus described above can be used with respect to other rights, other than event admissions.

It should be understood that certain variations and modifications of this invention would suggest themselves to one of ordinary skill in the art. The scope of the present invention is not to be limited by the illustrations or the foregoing descriptions thereof.

What is claimed is:

1. A computer controlled turnstile system, comprising:
a turnstile; and
a computer system coupled to the turnstile and to user terminals, wherein the computer system includes program code configured to cause the computer system to perform operations, comprising:
receive an order from a user for a first plurality of admissions each of first plurality of admissions granting access to at least one seat to a first event, wherein the order is received from a user terminal;
associate the first plurality of admissions to the first event with a first ticket;
provide a user interface configured to enable a user to instruct the computer controlled turnstile system to:
associate a second plurality of admissions to the first event with the first ticket, the second plurality of admissions being a first subset of the first plurality of admissions to the first event, and
associate a second subset of the first plurality of admissions to the first event with a second ticket;
receive information read from the second ticket at a venue associated with the first event; and
determine using the information read from the second ticket, that the second ticket entitles a number of people corresponding to the second subset of the first plurality of admissions access to the first event; and
a turnstile interface configured to, in response to the determination, enable the system to enable the turnstile to admit a number of people to the first event corresponding to the determination as to how many admissions to the first event are associated with the second ticket.

2. The system as defined in claim 1, further comprising a reading device including a display, wherein the reading device is configured to display how many admissions are associated with a ticket read by the reading device.

3. The system as defined in claim 1, wherein the system is configured to provide a recipient with a barcode in association with the second ticket and to store an association between the barcode and the first quantity.

4. The system as defined in claim 3, wherein the system is configured to provide the barcode to a mobile phone associated with the recipient.

5. The system as defined in claim 1, wherein the system is configured to associate the second ticket with a preexisting physical device associated with a designated recipient of the second ticket, so that the preexisting physical device is configured to provide admission to the first event.

6. The system as defined in claim 5, wherein the preexisting physical device is a driver license, a credit card, a loyalty card, or a membership card.

7. The system as defined in claim 1, further comprising a user interface configured to enable an operator to instruct the system to specify restrictions related to a limit on a quantity of admissions permitted to be associated with a single ticket for a given event.

8. The system as defined in claim 1, wherein the first ticket is associated with multiple admissions to each of a first plurality of events.

9. A networked access control system comprising:
an entry control device;
a network interface configured to receive user communications over a network and to receive ticket data read from tickets via a ticket reader located at an event venue;
instructions stored in a non-transitory computer readable medium, configured to cause a computing system including one or more computing devices to perform operations, comprising:
receive a request for a first plurality of admissions, each of which grants access to at least one seat to a first event, from a user;
cause, a user interface to be presented configured to enable a user to instruct the networked access control system to associate a second plurality of admissions to the first event, wherein the second plurality of admissions is a first subset of the first plurality of admissions to the first event, with a first ticket, and associate a second subset of the first plurality of admissions to the first event with a second ticket, wherein each admission associated with the first subset and the second subset grants access to at least one seat to the first event;
in response to receiving a user instruction provided via the user interface, associate a first number of admissions with the first ticket and store the association of the first number of admissions with the first ticket in memory, wherein the first number of admissions corresponds to the first subset of the first plurality of admissions to the first event, and associate a second number of admissions with the second ticket and store the association of the second number of admissions with the second ticket in memory,
wherein the second number of admissions corresponds to the second subset of the first plurality of admissions to the first event;
receive data from the ticket reader corresponding to the first ticket; and use the first ticket data read from the first ticket and the stored association of the first number of admissions with the first ticket to determine how many admissions to the first event are associated with the first ticket; and
an entry control device interface configured to, in response to the determination, enable the system to enable the entry control device to admit a number of people to the first event corresponding to the determination as to how many admissions to the first event are associated with the first ticket.

10. The system as defined in claim 9, wherein the entry control device includes a turnstile.

11. The system as defined in claim 10, wherein the entry control device interface enabling the entry control device to admit the number of people to the first event comprises, enabling the turnstile to turn for a number of times corresponding to the number of people.

12. The system as defined in claim 9, the system further comprising a display configured to display to a gate keeper the number of admissions to the first event associated with at least one ticket read by the ticket reader.

13. The system as defined in claim 9, the system further comprising a display located at the venue configured to display which events are associated with at least one ticket read by the ticket reader.

14. The system as defined in claim 9, wherein the program code is further configured to reduce the number of admissions associated with the first ticket when a person associated with the first ticket is being admitted to the first event.

15. The system as defined in claim 9, wherein the program code is further configured to cause the number of admissions associated with the first ticket to be displayed on a terminal located at the first event venue.

16. The system as defined in claim 9, wherein the program code is further configured to determine whether a second user is authorized to re-associate admissions from the first ticket and/or second ticket to another ticket.

17. The system as defined in claim 9, wherein the program code is further configured to provide the first ticket to the user via a mobile device.

18. The system as defined in claim 9, wherein the first ticket comprises an identifier associated with a preexisting card.

19. The system as defined in claim 9, the system further comprising a user interface configured to enable the user to instruct the networked access control system to enter an electronic address associated with a recipient of the second ticket.

20. The system as defined in claim 9, the program code further configured to associate admissions to a plurality of events with the first ticket in response to a user action.

21. The system as defined in claim 9, the program code further configured to:
  cause the user to be presented with information regarding seats associated with the first ticket in response to the first ticket being read at the first event venue; and
  cause a user interface to be presented to the user configured to enable the user to instruct the networked access control system to select which event venue seat is to be utilized by the user from the seats associated with the first ticket.

* * * * *